Feb. 2, 1926. 1,571,251
J. F. FAIRLEY
VEHICLE WHEEL
Filed August 2, 1923 2 Sheets-Sheet 1
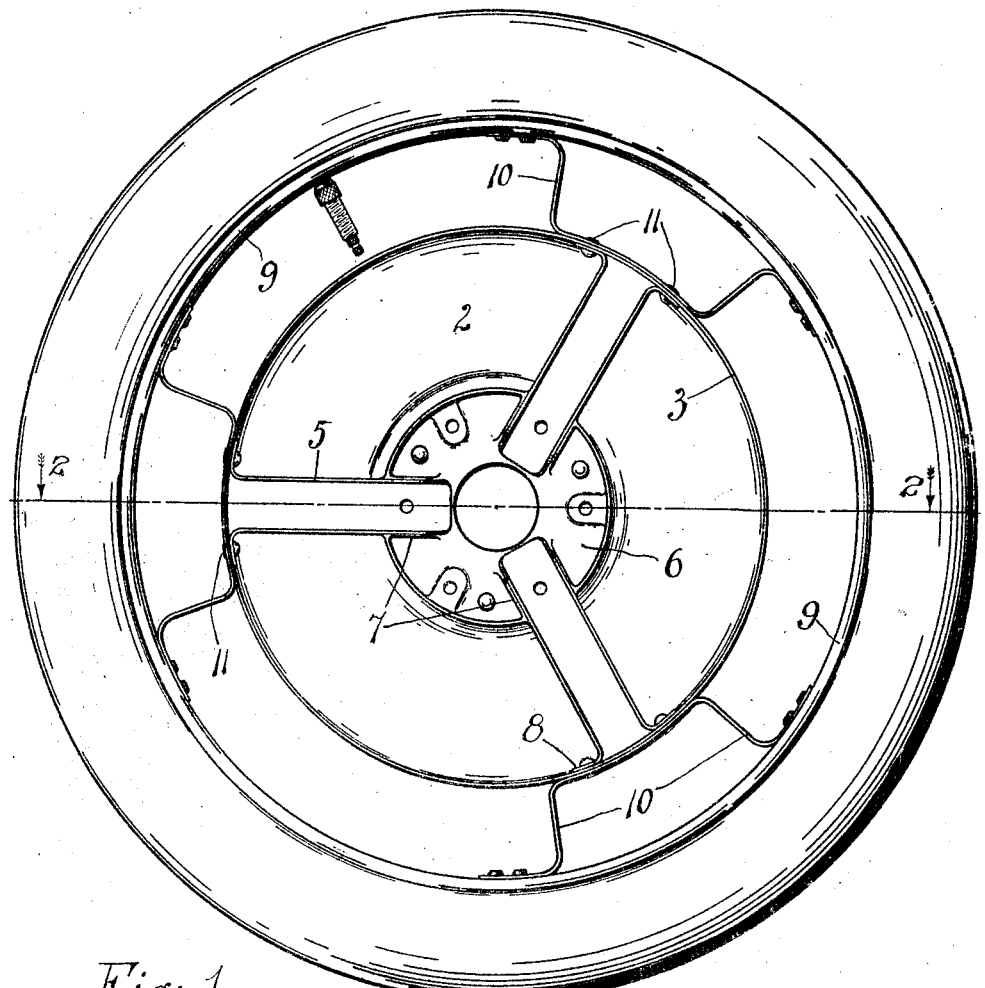
Fig: 1.
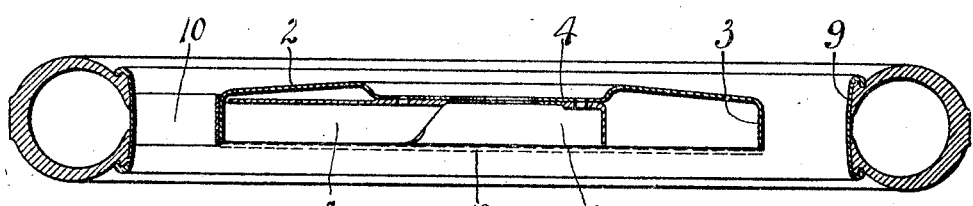
Fig: 2.
Inventor
James Frederick Fairley
Per. J. Fletcher Wilson
Attorney.

Feb. 2, 1926.

J. F. FAIRLEY

VEHICLE WHEEL

Filed August 2, 1923  2 Sheets-Sheet 2

Inventor
James Frederick Fairley
Per. J. Fletcher Wilson
Attorney.

Patented Feb. 2, 1926.

1,571,251

UNITED STATES PATENT OFFICE.

JAMES FREDERICK FAIRLEY, OF BIRMINGHAM, ENGLAND.

VEHICLE WHEEL.

Application filed August 2, 1923. Serial No. 655,344.

*To all whom it may concern:*

Be it known that I, JAMES FREDERICK FAIRLEY, of 165 Hamstead Road, Handsworth, Birmingham, England, a subject of the King of Great Britain, have invented new and useful Improvements in Vehicle Wheels, of which the following is a specification.

This invention has reference to vehicle wheels of the disc or semi-disc type and has for its object to provide an improved construction.

A wheel embodying the present invention is built up of a novel combination of a disc and spokes or their equivalent, the latter being entirely covered or concealed from the outside of the wheel by the disc.

A wheel or wheel centre built up in this way is secured indirectly to the tyre-carrying rim, there being interposed between such wheel centre and rim a resilient medium such, for example, as a series of springs formed and arranged to cushion the drive between the centre and rim and also to absorb road shocks of an intermediate intensity such as come between those absorbed by the tyre itself and those which are absorbed by the vehicle suspension system.

In the accompanying drawings,

Figure 1 is an elevation of the improved wheel as viewed from the back.

Figure 2 is a transverse sectional view of the same on line 2—2 of Figure 1.

Figure 5:
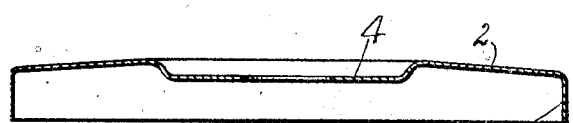

Referring to the drawing, the disc 2 which is made of sheet metal is, as shewn, of a preferably convex formation with a peripheral flange 3 directed inwardly at right angles to the plane of the wheel, as seen more clearly in Figures 2 and 5. This flange is preferably formed in one piece with the disc in which case it will be formed at the same time as the disc is pressed to the desired shape. The central portion 4 of the disc is depressed and formed parallel with the plane of the wheel.

Figure 3:
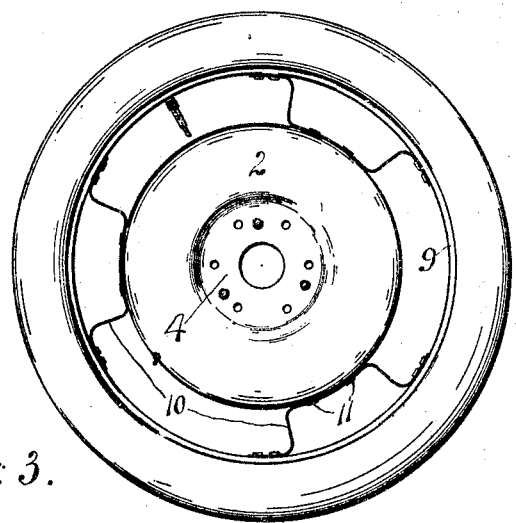
Figure 3 is a front view of the complete wheel on a smaller scale.
Figure 4:
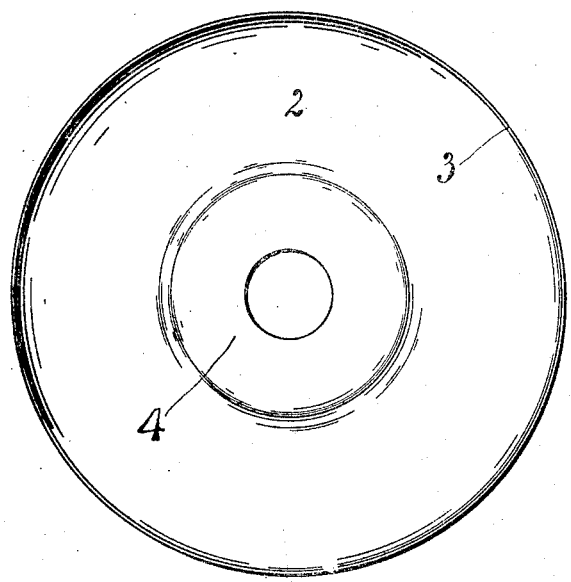
Figures 4 and 5 are front and cross-sectional views respectively of the disc itself.
Figure 6:
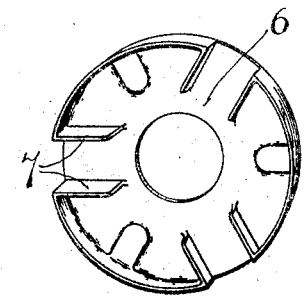
Figures 6 and 7 are detail views respectively of the nave plate and of one of the spokes.
Figure 7:
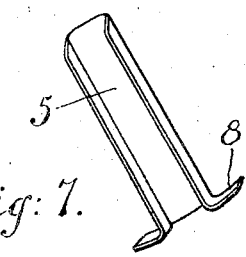

The spokes 5, Figure 7, are of channel or trough section and are received at their inner ends by a nave plate 6, Figure 6, which is concentrically arranged with respect to the central parallel portion of the disc and when the wheel is on the hub occupies a position between the hub flange and the said parallel portion 4 of the disc. For the reception of the inner ends of the spokes the nave plate 6 is provided on its inner face with a series of sockets 7.

The inner ends of the spokes are brazed or otherwise secured in their sockets and may be further prevented from relative movement by arranging for some of the studs by which the wheel is secured on the hub to pass through said sockets and to be tightened up in the ordinary way by nuts at the outside ends.

The outer ends of the spokes are formed with lugs 8 by which they are secured to the flange of the disc.

The tyre carrying rim 9 is supported concentrically around the disc by means of a number of blade springs 10 which are arranged with their widths at right angles to the plane of the wheel and are characterized in that their effective portions are mainly radial with more or less pronounced curvatures in opposite directions where they are secured to the rim 9 and to the flange 3 of the disc respectively.

The same rivets 11 which secure the outer ends of the spokes to the flange 3 of the disc may conveniently be utilized for securing the intermediate portion of the springs to the same part.

The back of the wheel centre may if necessary be covered by a plate 12 shewn in dotted lines in Figure 2.

I claim:—

1. A spoke reinforced disc structure for the purposes set forth comprising a disc having a peripheral flange, a nave plate coaxially arranged with respect to said disc, and a series of spokes severally secured at their outer ends to said flange and at their inner ends to said nave plate.

2. A spoke reinforced disc structure for the purposes set forth comprising a disc having a peripheral flange, a nave plate coaxially arranged with respect to said disc and having a series of radial sockets, and a corresponding series of spokes severally secured at their outer ends to said flange and at their inner ends in said sockets.

JAMES FREDERICK FAIRLEY.